United States Patent Office 3,458,476
Patented July 29, 1969

3,458,476
COMPLEX-FORMING POLYESTER PREPARED FROM GLYOXAL - BIS - (2-MERCAPTO-4-HYDROXY-ANIL)
Ernst Bayer, Melanchthon-Strasse 33, Tuebingen, Germany
No Drawing. Filed Aug. 26, 1966, Ser. No. 575,263
Claims priority, application Germany, Oct. 28, 1965, B 84,285
Int. Cl. C08g 17/08; C22b 11/00
U.S. Cl. 260—47                                    4 Claims

ABSTRACT OF THE DISCLOSURE

Complex-forming polyesters from esterified glyoxal-bis-(2-mercapto-4-hydroxy-anil) and a process for their production by contacting the anil with a reactive amount of a dicarboxylic acid dichloride in an inert gas atmosphere, an inert organic solvent, and an acid acceptor, the reaction being effected at about 10–40° C.

It has been found that complex-forming polyesters can be obtained by esterifying glyoxal-bis-(2-mercapto-4-hydroxy-anil) in an inert gas atmosphere with dicarboxylic acid dichlorides in the presence of an inert solvent and of a hydrogen chloride acceptor. The resulting complex-forming polyesters correspond to the general formula

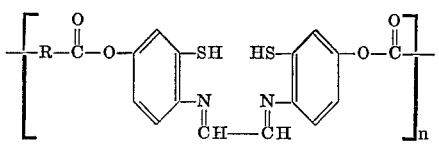

in which R represents a divalent aliphatic or aromatic radical and $n$ is a number greater than 12 and up to about 2000, preferably $n$ is in between about 20 and 200. R more specifically is a divalent alkyl radical, having 1 to 6 carbon atoms and phenyl and naphthyl radicals.

Suitable dicarboxylic acid dichlorides for the process according to the invention are e.g. aliphatic dicarboxylic acid dichlorides, having preferably 1 to 6 carbon atoms in the aliphatic radical and aromatic dicarboxylic acid dichloride and in particular terephthalic acid dichloride, and adipic acid. Suitable acid acceptors are, for example, organic or inorganic bases, such as pyridine, sodium hydroxide or potassium carbonate.

Suitable solvents are all organic solvents inert against the reaction, e.g. aliphatic and aromatic hydrocarbons chlorinated hydrocarbons, heterocyclic solvents, such as benzene, toluene, hexane, chlorobenzene and pyridine.

The process is preferably carried out at temperatures in the range from 10 to 40° C. Although the reactions are preferably employed in substantially equivalent quantities, it is also possible to use one of them in excess up to about 10 times the equivalent amount.

The resulting polycondensates are insoluble in organic solvents, water and dilute acids. They are specific complex formers for gold(III) ions. The complex formers according to the invention only absorbs metals of the First and Second Subsidiary Groups of the Periodic System. Of these metals, gold is very much preferred, as shown by the following table:

| Ion | Capacity | |
|---|---|---|
| | Percent of theoretical | G. atom/100 g. polyester |
| $Zn^{2+}$ | 0 | 0 |
| $Cd^{2+}$ | 0 | 0 |
| $Hg^{2+}$ | 1.3 | 0.003 |
| $Cu^{2+}$ | 11.1 | 0.025 |
| $Ag^+$ | 11.2 | 0.025 |
| $Au^{3+}$ | 44 | 0.10 |

By virtue of their insolubility, the polyesters according to the invention can be used for the selective absorption of gold(III) ions from dilute solutions. The high selectivity of the condensates according to the invention is quite astonishing. Since the absorbed gold(III) ions are readily released again, the substances may be used as gold-specific ion exchangers.

The accumulated gold ions can be removed by treatment with acid. Hydrochloric acid is particularly suitable and is generally used as 4 N acid. It is advisable to leave the acid in contact for a prolonged period, with or without agitation. The contact time may be as long as 12 hours. The material may then be used again to absorb gold.

These methods of recovering the gold result in concentrated gold(III)-salt solutions, more specifically in complex salt solutions. The metallic gold has to be recovered from the solutions obtained according to known methods.

In another method of recovering the gold the charged complex-forming poly-Schiff's base is heated to a temperature above about 250 and up to 600° C. The organic material is destroyed in this heating process and the gold is recovered in metallic form. As the poly-Schiff's base has a very high capacity of absorbing gold, the amounts of this polymer used are rather small. Therefore, destroying these absorbing agents may be more economical than an expensive recovering process.

The extraordinarily high resistance of these polyesters to acids produces relatively high concentrations of the enriched metal ion in the eluates. In the cold, the polyester is only decomposed by concentrated sulphuric acid and fuming nitric acid. It is not even dissolved by 25% by weight sulphuric acid at boiling temperature.

Example 1

1.57 g. (0.05 mols) of glyoxal-bis-(2-mercapto-4-hydroxy-anil) are dissolved in 20 ml. of absolute pyridine at 20° C. A solution of 1.02 g. (0.01 mol) of terephthalic acid dichloride in 10 ml. of chloroform, is slowly added dropwise to the mixture at 20° C. in a stream of nitrogen. The resulting light brown suspension is stirred for 2 hours at room temperature and then for another two hours at 70° C. in a gentle stream of nitrogen. After cooling to 20° C., 100 ml. of 2 N sulphuric acid are added to it. The resulting light-brown deposit adheres to the walls of the flask. For this reason, the water/pyridine/chloroform mixture is decanted off and the residue is dried at a water-bath temperature of 70° C./14 mm. Hg, leaving a light-brown powder.

To remove low molecular weight impurities, the intermediate product is successively washed with 20 ml. of pyridine, 20 ml. of methanol, 20 ml. of acetone and 20 ml. of ether. The polymer thus pre-purified is stirred for 24 hours at 20° C. with 100 ml. of 2 N hydrochloric acid in order to dissolve out the acid-soluble constituents. The product is then suction-filtered, washed with distilled water until the filtrate reacts neutrally and then dried over diphosphorus pentoxide for 24 hours at 20° C./14 mm. Hg. The product is a light-brown, coarse-grained powder which is insoluble in 25% by weight sulphuric and in 5 N hydrochloric acid. It decomposes in cold concentrated sulphuric acid to form a clear, reddish-violet solution. Yield=2.0 g. (92% of the theoretical).

Example 2

1 ml. of a 0.01 molar solution of zinc sulphate, 1 ml. of cadmium acetate, 1 ml. of mercury(II) acetate, 1 ml. of copper acetate and 1 ml. of tetrachloro-gold(III) acid, are mixed together and made up to 1 litre with distilled water. 1 g. of the polyester of Example 1 is added to this solution which is then shaken for 12 hours at room temperature. The polymer is then filtered off, after which the metal content both of the filtrate and of the macromolecule are determined. Whereas the gold has been quantitatively combined by the macromolecule, mercury (II)-, cadmium- and zinc-ions remain quantitatively in the solution. Only a trace of copper(II) is combined by the macromolecule. Overall, the macromolecule absorbs 1.88 mg. of gold (96%), 0.009 mg. of copper (1.5%) and less than 0.002 mg. each of cadmium, zinc and mercury.

Example 3

A sample of 500 ml. of water from an inland lake containing approximately 0.7% by weight of salt, 5 p.p.m. of gold, 4.2 p.p.m. of silver, 21 p.p.m. of copper and 94 p.p.m. of iron, is shaken for 24 hours at 20° C with 100 mg. of a polyester obtained in accordance with Example 1. The polymer is then filtered off and the metal content determined. The macromolecule absorbs the quantities set out in the table (percent yield in parentheses).

| Metal: | Polyester |
|---|---|
| Gold | 19.0γ (73%) |
| Silver | 1.1γ (5%) |
| Copper | <0.1γ |
| Iron | <0.1γ |

I claim:
1. A polyester consisting essentially of recurring units of the formula

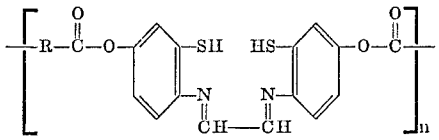

where R is a divalent aliphatic or aromatic hydrocarbon radical, and $n$ is an integer of about 12–2000.

2. The polyester of claim 1 wherein R is a member selected from the group consisting of an alkyl of 1–6 carbon atoms, phenyl and naphthyl; and $n$ is an integer from 20–200.

3. A process for producing a complex-forming polyester which comprises contacting a glyoxal-bis-(2-mercapto-4-hydroxy-anil) with a reactive amount of a dicarboxylic acid dichloride in an inert gas atmosphere, an inert organic solvent, and an acid acceptor effecting a reaction at a temperature of about 10–40° C.

4. The process of claim 3 wherein the dicarboxylic acid hydrochloride is an aliphtic or aromatic dicarboxylic acid dichloride and the acid acceptor is an organic or inorganic base.

References Cited

UNITED STATES PATENTS 2,035,578   3/1936   Wagner _____ 260—2

WILLIAM H. SHORT, Primary Examiner

L. L. LEE, Assistant Examiner

U.S. Cl. X.R.

75—100; 260—2.1, 75, 566